US005954185A

United States Patent [19]

Eshelman et al.

[11] Patent Number: 5,954,185

[45] Date of Patent: Sep. 21, 1999

[54] CENTRIFUGAL FEEDER

[75] Inventors: Michael Eshelman, New Port Richey; George Harrison, Brooksville, both of Fla.; Jack Roach, Wrightsville, Pa.; Chad Roberts; Brian Karp, both of Spring Hill, Fla.; David Pugh, Brooksville, Fla.; Sean Coombs, Lansing, Mich.

[73] Assignee: Sims Machine & Controls, Inc., Brooksville, Fla.

[21] Appl. No.: 08/907,156

[22] Filed: Aug. 6, 1997

[51] Int. Cl.$^{6}$ .................................................. B65G 47/256

[52] U.S. Cl. .......................................... 198/396; 198/395

[58] Field of Search .................................... 198/391, 392, 198/395, 396, 399, 756, 757

[56] References Cited

U.S. PATENT DOCUMENTS

| | | | |
|---|---|---|---|
| 3,828,921 | 8/1974 | Tackett, Jr. | 198/396 |
| 4,138,009 | 2/1979 | Strong | 198/396 |
| 4,266,653 | 5/1981 | Mergl | 198/396 X |
| 4,699,261 | 10/1987 | Nesin | 198/396 X |
| 4,884,678 | 12/1989 | Graham et al. | 198/395 X |

*Primary Examiner*—James R. Bidwell
*Attorney, Agent, or Firm*—Harold D. Shall

[57] ABSTRACT

A centrifugal feeder for rectangular items with one of its upper or lower surfaces having luminescent characteristics which are greater than the other surface. It is desired to orient the items with its elongated axis in the direction of the output and its luminescent surface downward. The feeder has a rotating bowl surrounded by a rotating rim. Items are placed on the rotating bowl by any suitable device. A sweep pushes the items randomly onto the rim and a pair of sweeps then insure that the items are flat and only one layer high. The rim then narrows so that items not disposed with their elongated axis tangentially will over balance and fall off the rim. A sensor then determines the space between items, and if the space exceeds a preselected interval, signals for more items to be placed onto the bowl. A luminescence sensor then determines if the item thereunder is disposed with its greater luminescent surface up and a kick off device kicks off items with the greater luminescent side up. As the items fall off the rim a turn over device places the items on the bowl with the desired surface up and the items then go through the selection process again along with the newly deposited items.

11 Claims, 4 Drawing Sheets

31
15C
23
30
26
17
32
27
22
A
16
22A
21
19
14A
13
13A
18
B
14

CENTRIFUGAL FEEDER

BACKGROUND OF THE INVENTION

1. Field of the Invention

This invention relates to high capacity centrifugal feeders generally and more particularly to such a feeder which is equipped with tooling enabling the feeder to sort material which is randomly delivered to the same and deliver such material at its output in a desired orientation.

2. Description of Prior Art

Centrifugal feeder drive units such as an FT-30SS unit available from the Hoppman Corporation bearing U.S. Pat. Nos. 5,145,051; 4,848,559; 4,723,661; 4,821,920; 4,848,100; and 4,305,496 are commercially readily available. Such units must be tooled and modified to perform the desired task.

The task desired to be performed is to orient a substantially flat item which is an elongated rectangular item and which, when oriented, has its elongated axis in the direction of the output and its upper and lower surface in the desired position. The items beings sorted have one of its upper or lower surfaces luminescent and the other less luminescent and, upon the tooling detecting which surface is upward, rejecting the item which is not oriented as desired. A prior art device to perform such an operation was not found.

SUMMARY OF THE INVENTION

The items to be oriented and delivered are elongated rectangular items with upper and lower surfaces, one of which is luminescent and the other is less luminescent. The upper and lower surfaces are wider than the side surfaces.

This invention includes a centrifugal feeder having a revolving central surface bounded by an outer revolving rim upon which a sweep arm deposits the items which have been delivered upon the feeder's revolving central surface. The items move along with and on the rim and encounter a first sweep which knocks off items which are stacked on top of other items or that are presented on their side edge so that only a single layer of items is present on the rim which are lying on either their upper or lower side. This is then verified by a second sweep. A shroud around the rim makes the exposed portion of the rim progressively narrower until it is so narrow that items which are arranged with their longitudinally elongated axis in a radial direction become over balanced or otherwise are over balanced and fall off the rim. Thus at this point, a single layer of items with their elongated axis disposed in a tangential direction are present on the rim. A gap sensor at this location determines the time gap between adjoining items and if the gap exceeds approximately 0.4 of a second, a signal is given to the device delivering items to the bowl of the feeder to deliver more items. A luminescence sensor then checks the upper surface of each item as it goes past and if a high enough level of luminescence is detected, a signal is given to an air valve which then blows the parts of f of the rim to an area on the revolving surface which has been swept clear of items at this location by a sweep. As the items fall off the rim they encounter a turnover member which turns them over so that when they fall on the revolving surface the desired less luminescent surface will be up and the next time the item is delivered on the rim it will have its desired surface up instead of being in a random situation as when first delivered on the revolving surface. At this point, all the items on the rim are oriented as desired and are delivered to the output of the feeder.

DETAILED DESCRIPTION OF THE PREFERRED EMBODIMENT

Figure 1:
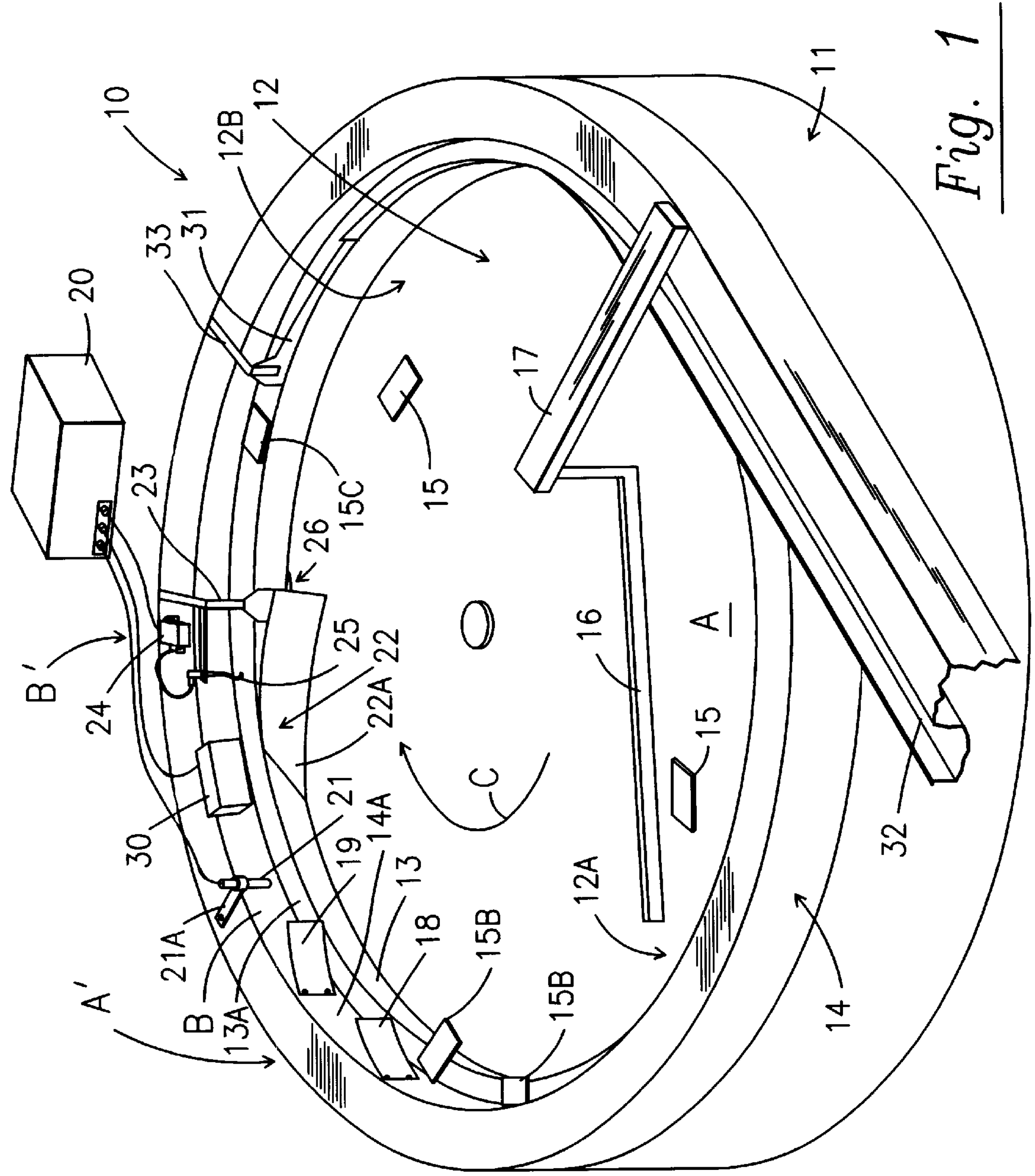
FIG. 1 is a perspective view of a centrifugal feeder incorporating this invention.
Figure 2:
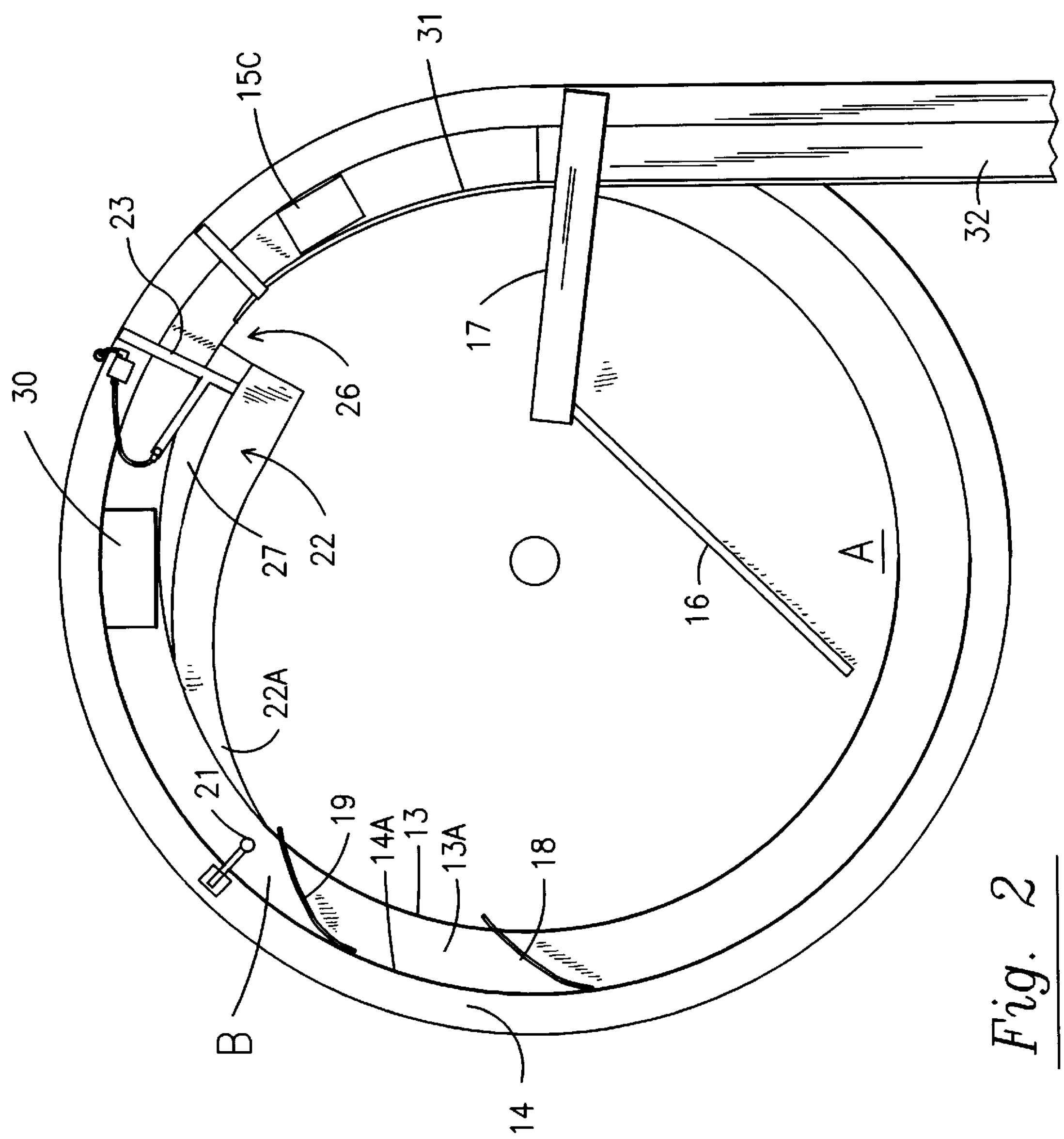
FIG. 2 is a plan view of the device shown in FIG. 1.
Figure 3:
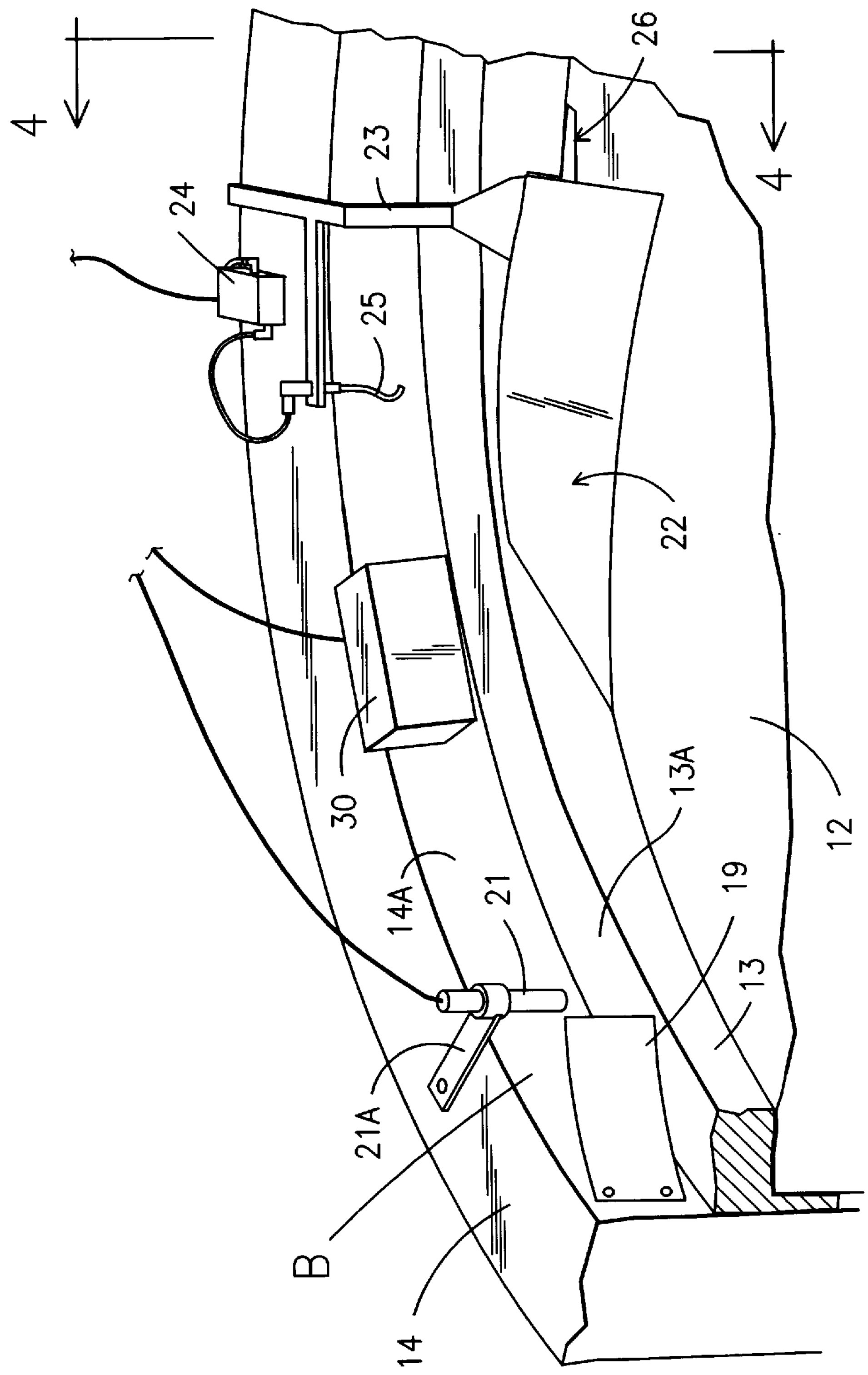
FIG. 3 is an enlarged view of a portion of the device shown in FIG. 1, which portion lies between the lines A'and B'in FIG. 1.
Figure 4:
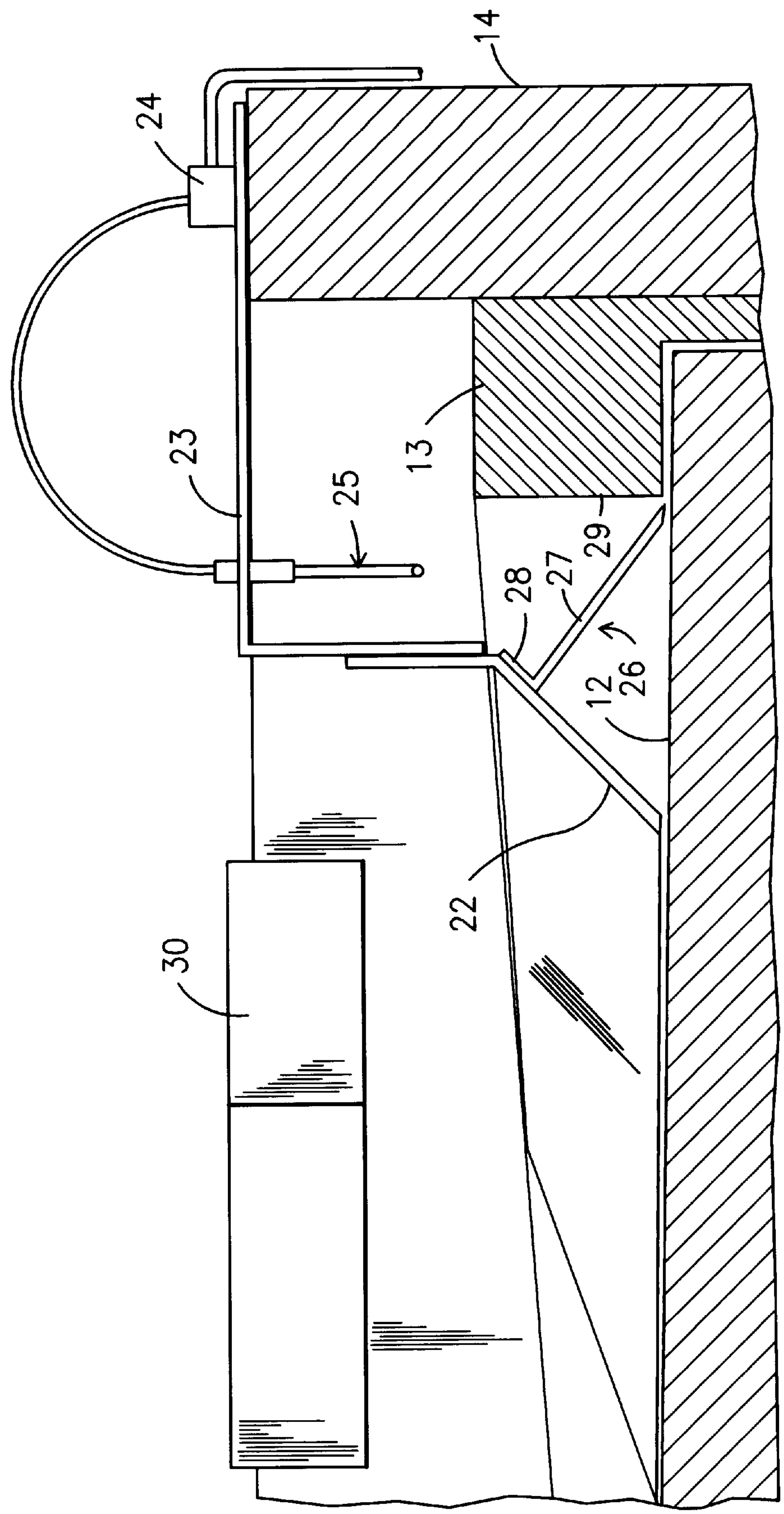
FIG. 4 is a sectional view taken along the lines 4—4 in FIG. 3.

Referring now to the drawings, a centrifugal feeder is shown generally at 10 having a base shown fragmentarily at 11, which base contains the rotary driving mechanism of the feeder and, its upper surface having a rotable feeder bowl 12 surrounded by a simultaneously rotating rim 13; the bowl 12 and rim 13 being driven by the driving mechanism contained within the base 11 as purchased from Hoppman Corporation. The bowl 12 is disposed at an angle so that its portion 12A is coplaner with the upper surface 13A of the rim 13, while its portion 12B which is 180° from portion 12A is disposed substantially below the upper surface 13A. Accordingly the bowl 12 is disposed at an angle of approximately 15°. A shroud 14 secured to the base 11 surrounds the rim 13. Such a centrifugal feeder as described so far can be purchased from Hoppman Corporation identified as an FT-30SS.

The items to be sorted and delivered are shown as 15 and have an elongated longitudinal axis which is greater than its width and a height which is less than its width. They thus have upper and lower rectangular surfaces. The inner wall 14A of the shroud 14 is not concentric with the rim 13 and thus at the location 12A is spaced from the inner edge of the rim 13 more than a distance which is one-half the length of the items 15, and by the time the wall has reached position indicated at 13A, the rim has been narrowed to slightly less than ½ of the length of an item 15 and then continues at such width until approaching the return to position A.

The items to be sorted have one of their upper or lower surfaces which is white and therefore substantially luminescent and the opposite surface being less luminescent, such as blue. It is desired to deliver the items to the output of the feeder with their elongated longitudinal axis disposed tangentially to the feeder and with the blue surface disposed upwardly.

To that end, the parts 15 are deposited on the upper surface of feeder bowl 12 at position A by any suitably supply mechanism, such as manually or by conveyor or the like in an amount sufficient to meet the supply demands of the feeder, such demands being explained hereinafter. The bowl rotates clockwise as shown by the arrow C and a semi flexible internal sweep arm 16 secured to the top of the shroud 14 by a rigid bracket 17 engages the parts 15 being carried by the bowl and randomly deposits such parts on top of the rim 13 as shown by the parts 15B. Since the parts 15B may be positioned multi-leveled, or on their side edges, a first mechanical sweep 18 secured to the inner wall 14A of the shroud 14 overlies the rim 13 and is spaced therefrom an amount slightly more than the height of an item 15, so that only a single level of items, lying on either their upper or lower (blue or white) surface can pass thereunder with the second level or edge standing items being swept off the rim 13 and redeposited on the bowl 12 to make another circumferential pass and then again being swept at position A. A second mechanical sweep 19, circumferentially displaced from the sweep 18 and also overlying the rim 13 and spaced therefrom a distance slightly greater than the height of the items 15, verifies that the items are properly riding on the rim one high on either their upper or lower side at that location. At a position just past the second sweep 19, the upper surface of the rim 13 has narrowed sufficiently so that parts which are oriented incorrectly with less than one half thereof on the rim or with their longitudinal axis misdirected will over balance and fall off of the rim and back onto the bowl 12 to make another circumferential pass.

Just circumferentially past the position B, the items 15 pass below a fiber optics sensor 21, TRI-TRONICS part No. SEIF1 (sensor) and F-A-36TR (fiber optic lead) which senses the time gap between adjacent items 15, and if the gap is more than 4/10 of a second provides a signal to a control box 20 to activate the delivery of more items onto the feeder bowl 12 at location A. The sensor 21 is secured to the shroud 14 by a bracket 21A. Immediately downstream or clockwise of the sensor 21 is the start of an internal mechanical sweep 22 secured to an “L” shaped bracket 23 which in turn is secured to the top of the shroud 14. The sweep 22 is circumferentially elongated and extends from its starting end 22A adjacent the optical sensor 21, which end 22A is closely spaced to the rim 13, and extends arcuately in a clockwise direction and somewhat radially inwardly so that a space exists between the back side thereof and the rim 13. The sweep 22 clears the way behind it free of items coming thereto on the bowl 12 circumferentially from position B.

Clockwise of the optic sensor 21 is a luminescence sensor 30 which checks the luminescence properties of items on the rim below the same. The sensor 30 which can be adjusted to a luminescence critical level at which level it provides a signal, is secured to the inner wall 14A of the shroud 14 and overlies the rim 13. Such a sensor can be commercially obtained and is known as a Sick Sensor Catalog #E10, Part #LUT2-6-20. If an item 15B is disposed on the rim 13 with its white more luminescent side upwardly, the luminescence sensor will detect the same and will send a signal to the control box 20 which will in turn provide a signal to a “kick off” device in the form of an air valve 24 which can be commercially obtained from Mac Valve Catalogue #9C, Part #113B-501CAAA, which valve in turn supplies a short blast of air to a nozzle 25 carried by the bracket 23, which nozzle delivers the air in a direction to dislodge an item adjacent thereto off of the rim and behind the sweep 22.

Turn over means 26 is deposed between the back of sweep 22 and the rim 13. More particularly, an arcuately shaped member 27 is secured at its upper and radially inward edge 28 to the upper outer edge of the sweep 22 and extends downwardly and outwardly therefrom to lie along the side of the base of the rim 13 at the juncture of the bowl 12. Items blown off the rim will fall downwardly onto the member 27 and in so doing will tend to be tuned over so that its luminescent side will now be down. The item will move down the member 27 until it reaches the inner surface of the rim 13 and be carried by the rim circumferentially along the member 27 until it reaches the end thereof and falls onto the feeder bowl 12 to be carried back to position A and start its trip over again. With the parts rejected by the kick off device being turned over before reaching the bowl, a higher percentage of items which are again returned to the rim 13 will be positioned with its luminescent surface down as desired than would be the case if the items were merely allowed to fall off the rim in an uncontrolled manner.

Items 15*c* on the rim 13 past the luminescence sensor 30 have all been verified to be in the desired orientation and will move past a pressing member 31 which insures that all items at this location are banked against the inner wall 14A of the shroud 14 before reaching the discharge 32 of the feeder 10. The pressing member 31 is arcuately elongated and secured to the shroud 14 by a bracket 33 and lies along the inner edge of the rim 13. Subsequent to the discharge of the items 15C at position 32, the next desired operation on the items can be performed.

Although the above description relates to a presently preferred embodiment, numerous changes can be made therein without departing from the scope of this invention as claimed in the following claims.

What is claimed is:

1. A centrifugal feeder for arranging items in a desired orientation and wherein the items have an upper and a lower surface with one of the surfaces being of a greater luminescence than the other and with the height of the sides and ends being less then the width of the upper and lower surfaces comprising in combination, (a) a centrifugal feeder having a rotating circular bowl, a rotating rim surrounding said bowl and a shroud surrounding said rim and said bowl, and including drive means in said feeder for rotating said bowl and said rim, (b) said bowl having an initial position with the bowl at such position being, (1) coplaner with the top of said rim adjacent thereto, and (2) disposed at an angle relative to said rim whereby the portion of said bowl diametrically opposed to said coplaner position is below the top of said rim while still being bounded by said rim, (c) said shroud having an inner wall surrounding the outer side of said rim with said inner wall being spaced from the inner side of said rim at said initial position a distance such that the width of said rim is greater than the width of the items to be arranged and being spaced at a second position circumferentially removed from said initial position a distance such that the width of said rim is substantially the same as the width of the upper and lower surfaces of the items, (d) a first sweep means carried by said shroud and overlying said bowl and located at said initial position for sweeping items carried by said bowl onto said rim as the bowl rotates therepast, (e) a second sweep means carried by said shroud and overlying said rim and spaced from the top of said rim a distance slightly greater then the width of the side of the items for discharging items from said rim back onto said bowl, which items are disposed other than in a single layer lying on either its upper or lower surface, (f) luminescence detector means disposed over said rim at a position past said second sweep means for detecting the luminescence qualities of the upper surface of items passing thereunder and for providing an output signal in the event the upper surface of the item thereunder is luminescent to a preselected degree, (g) kick off means actuated by said output signal for dislodging items from said rim onto said bowl when activated by said detector means, and (h) control and circuit means for passing the signal from said detector means to said kick off means, (i) whereby items on said rim rotated past said kick off means are disposed in the desired orientation.

2. A feeder according to claim 1 including a third sweep means overlying said bowl at a position just circumferentially prior to the location of said kick off means for sweeping items on said bowl adjacent said rim toward the center of said bowl thereby to provide a clear space on said bowl behind said third sweep means.

3. A feeder according to claim 1 including turn over means for turning over items dislodged from said rim by said kick off means.

4. A feeder according to claim 2 including turn over means for turning over items dislodged from said rim by said kick off means.

5. A feeder according to claim 4 wherein said turn over means is positioned to deposit dislodged items onto the clear space on said bowl behind said third sweep means.

6. A feeder according to claim 5 wherein said third sweep means is an internal mechanical third sweep and included bracket means connected to said shroud means, said third sweep is circumferentially elongated and extends from its starting end closely spaced from said rim and extends in the direction of the bowl's rotation and closely overlies said bowl and with its end remote from its starting end being spaced from said rim.

7. A feeder according to claim 6 wherein said turn over means is carried by said third sweep means.

8. A feeder according to claim 7 wherein, said turn over means is, (a) carried by said third sweep means at a location between said third sweep means and said rim, (b) in arcuately elongated and closely spaced from said rim, and (c) as dislodged items fall thereon they are turned over and then deposited on said bowl.

9. A feeder according to claim 1 wherein spaced sensing means senses the space between adjoining items on said rim and provides a signal to call for more items to be deposited on the bowl at its initial position when the time gap between adjoining items on said rim exceeds approximately 0.4 seconds.

10. A feeder according to claim 9 including a fourth sweep means carried by said shroud subsequent to said second sweep means for insuring that said second sweep means has properly dislodged items from said rim and a pressing member disposed subsequent to said kick off means for pressing items on said rim firmly against said shroud, and discharge means for carrying items on said rim subsequent to said pressing member and out of said feeder.

11. A feeder according to claim 1 wherein the items to be arranged have upper and lower surfaces which are elongated rectangles and said inner wall of said shroud surrounding said rim at said second position is spaced from the inner side of said rim a distance such that items passing the same with their elongated axis other than being disposed substantially tangentially will be overbalanced and fall off the rim.

* * * * *